(No Model.)
J. W. MADDEN.
INSECT TRAP.
No. 547,220. Patented Oct. 1, 1895.
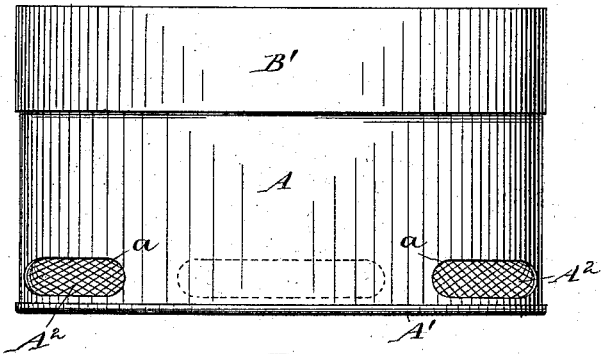
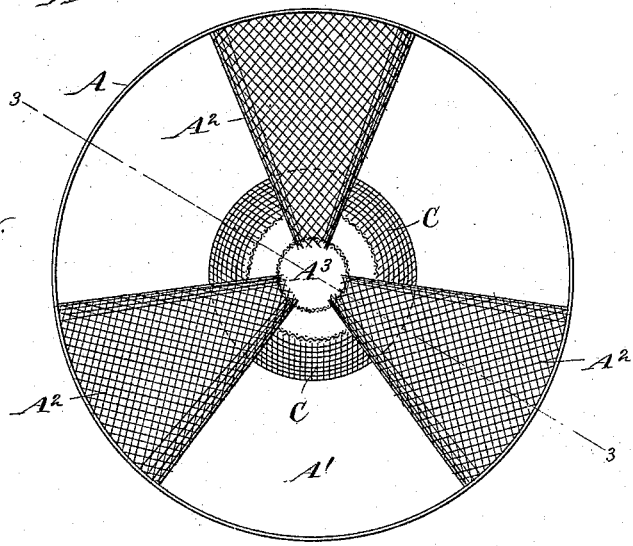
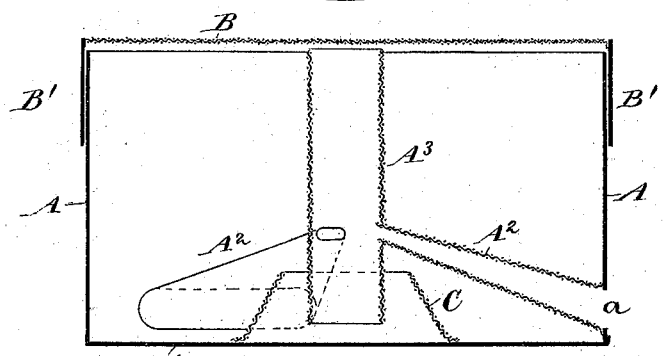
Witnesses:
Chas. E. Searle.
Richard Handy
Inventor:
James W. Madden,
by his attorney
Charles R. Searle.

UNITED STATES PATENT OFFICE.

JAMES W. MADDEN, OF BROOKLYN, NEW YORK.

INSECT-TRAP.

SPECIFICATION forming part of Letters Patent No. 547,220, dated October 1, 1895.

Application filed August 13, 1895. Serial No. 559,138. (No model.)

*To all whom it may concern:*

Be it known that I, JAMES W. MADDEN, a citizen of the United States, residing in Brooklyn, in the county of Kings and State of New York, have invented a certain new and useful Improvement in Insect-Traps, of which the following is a specification.

The invention is intended to serve more particularly in catching water-bugs and other insects of similar habits.

It consists of a casing in the form of a cylindrical box having a tight bottom and a closely-fitting cover. Three or other number of long narrow apertures or slots equally spaced are provided near the lower edge of the casing, to which are matched a corresponding number of flattened cones, extending inwardly toward the center at a slight upward inclination, joined to and communicating with a vertical cylindrical passage or tube reaching from a point near the bottom to within a short distance of the under face of the cover. The lower end of the tube is surrounded by a low annular barrier of somewhat larger diameter secured to the bottom. The passages, tube, barrier, and cover are preferably of wire-gauze. Suitable bait being placed within the casing outside the barrier, the water-bugs attracted thereby enter the flattened cones through the slots and travel inward by the passages so formed to the tube. They may then either ascend or go downward to reach the bait, passing thereto in the one case on the under surface of the cover or in the other over the barrier. The spaces between the ends of the tube and the adjacent surfaces of the bottom and cover are so narrow that the bugs attempting to escape do not enter the tube, but travel its outer surface to the under face of the cover, and thence again downward along the inner surface of the casing. The barrier protects the lower end of the tube against obstruction by the displacement of the bait, and also guards that opening against the escape of the bugs by leading them upward to the outer surface of the tube. The rough ends of the wire-gauze forming the flattened cones project into the tube and tend to prevent the egress of the bugs. The trap and its contents may be submerged in water until the bugs are drowned, or they may be dispatched by other means.

The accompanying drawings form a part of this specification and represent what I consider the best means for carrying out the invention.

Figure 1 is a side elevation. Fig. 2 is a plan view with the cover removed. Fig. 3 is a cross-section on the line 3 3 in Fig. 2.

Similar letters of reference indicate the same parts in all the figures.

A is a cylindrical casing of tinned sheet-iron, having a bottom A' of the same material secured thereto by soldering in the usual manner.

B is a circular disk of wire-gauze, soldered at its edges to a ring B' of tin, adapted to match closely around the upper edge of the casing A, the two parts forming a cover held in place by friction.

$A^2$ $A^2$ are cones of wire-gauze, flattened, as shown, and soldered at the large ends to the casing A, surrounding correspondingly-shaped slots $a$, formed therein at three equidistant points in the circumference near the bottom, extending upward and inward nearly to the center, where the small ends enter properly-shaped apertures cut in a wire-gauze tube $A^3$, standing vertically on the axial line of the casing, supported by the cones $A^2$, soldered thereto. The tube reaches nearly to the under face of the cover B when the latter is forced home, and nearly but not quite to the bottom A', forming with the cones $A^2$ and slots $a$ open passages from the exterior of the casing to the interior.

C is the barrier surrounding the lower end of the tube. It is of wire-gauze in the form of a truncated cone and is soldered to the bottom A' in the position shown. Its smaller upper end is of greater diameter than the tube $A^3$ and forms a narrow annular passage around the latter.

The space between the under face of the cover B and the upper end of the tube $A^3$ may be increased or diminished to a limited extent by engaging more or less of the ring B' in applying the cover.

Modifications may be made in the forms and proportions to adapt the trap for catching roaches or other insects. I can employ a greater or less number of the flattened cones $A^2$ $A^2$. The casing A may, if preferred, be also of wire-gauze. The trap will serve with some success without the barrier C. I prefer the whole, as shown.

I claim—

1. The insect trap described, consisting of the casing A having slots $a$, the bottom A' and cover B, B', in combination with the inwardly projecting flattened cones $A^2$ matching to the said slots, and the vertical tube $A^3$ to which the inner ends of the said cones are joined to form open passages from the exterior of the casing to the interior of the tube, all arranged to serve substantially as herein specified.

2. The insect trap described, consisting of the casing A having slots $a$, the bottom A' and cover B, C', in combination with the inwardly projecting flattened cones $A^2$ matching to the said slots, and the vertical tube $A^3$ to which the inner ends of the said cones are joined to form open passages from the exterior of the casing to the interior of the tube, and the barrier C surrounding the lower end of said tube, all arranged to serve substantially as herein specified.

In testimony that I claim the invention above set forth I affix my signature in presence of two witnesses.

JAMES W. MADDEN.

Witnesses:
ROBT. CONNOR,
WILLIAM F. KIDDER.